(12) United States Patent
Yoo et al.

(10) Patent No.: US 7,819,574 B2
(45) Date of Patent: Oct. 26, 2010

(54) BACKLIGHT ASSEMBLY AND DISPLAY DEVICE HAVING THE SAME

(75) Inventors: Byung-Cheon Yoo, Chungcheongbuk-do (KR); Yong-Hyun Hwang, Asan-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 12/255,261

(22) Filed: Oct. 21, 2008

(65) Prior Publication Data

US 2009/0168405 A1 Jul. 2, 2009

(30) Foreign Application Priority Data

Dec. 28, 2007 (KR) .................... 10-2007-0140895

(51) Int. Cl.
*F21V 8/00* (2006.01)

(52) U.S. Cl. .................... 362/633; 362/632; 362/634; 362/609

(58) Field of Classification Search ......... 362/632–634, 362/217, 1, 217.11, 217.15, 609, 97.1, 97.2
See application file for complete search history.

(56) References Cited

U.S. PATENT DOCUMENTS

| 7,033,064 | B2 * | 4/2006 | Ida ............................. 362/634 |
| 7,165,862 | B2 * | 1/2007 | Wu ............................. 362/218 |
| 7,465,082 | B2 * | 12/2008 | Sakamoto et al. ........... 362/609 |
| 7,488,101 | B2 * | 2/2009 | Brukilacchio ................ 362/554 |
| 7,513,661 | B2 * | 4/2009 | Hamada et al. .............. 362/373 |
| 7,524,210 | B2 * | 4/2009 | Lee et al. ................ 439/620.02 |
| 7,581,845 | B2 * | 9/2009 | Lee ............................. 362/97.2 |

* cited by examiner

*Primary Examiner*—Anabel M Ton
(74) *Attorney, Agent, or Firm*—F. Chau & Associates, LLC

(57) ABSTRACT

A backlight assembly and a liquid crystal device having the same are provided. The backlight assembly includes a lamp unit configured to generate light, a reflection sheet configured to reflect the light from the lamp unit and a receiving frame having at least one recess portion configured to fix the reflection sheet so that the reflection sheet can be fixed to the backlight assembly without using an adhesive.

20 Claims, 8 Drawing Sheets

BACKLIGHT ASSEMBLY AND DISPLAY DEVICE HAVING THE SAME

CROSS-REFERENCE TO RELATED APPLICATION

This application claims priority to Korean Patent Application No. 10-2007-0140895 filed on Dec. 28, 2007, the contents of which are incorporated by reference in their entirety.

BACKGROUND

The present disclosure relates to a backlight assembly and a display device having the same, and more particularly, to a backlight assembly for improving the assembling efficiency of a reflection sheet by fixing the reflection sheet using a receiving frame and a display device having the backlight assembly.

A liquid crystal display device (LCD) is a flat panel display device that displays desired images by changing orientations of liquid crystal molecules arranged in a matrix configuration to adjust light transmittance. The LCD device includes a backlight assembly that is disposed below a liquid crystal display panel to provide light to the liquid crystal display panel because the LCD is a passive device that cannot emit light by itself.

The backlight assembly includes a light source and components configured to guide light from the light source to the liquid crystal display panel. A reflection sheet is one of the components. The reflection sheet is disposed below the light source. Accordingly, the reflection sheet reflects light that is downwardly emitted from the light source, i.e., in an opposite direction from the liquid crystal panel, toward the liquid crystal display panel, thereby enhancing efficiency of light transmission from the light source.

The reflection sheet may be attached to a lower structure using an adhesive or a double-sided adhesive tape during an assembling process for the backlight assembly. That is, a double-sided adhesive tape is adhered to a thin reflection sheet and then the reflection sheet is attached to a lower structure. However, since the reflection sheet is easily bent or warped due to its thinness, it is difficult to attach the reflection sheet to the lower structure. Particularly, as the size of the reflection sheet increases, such a difficulty becomes more serious, leading to deterioration in the assembling efficiency of the backlight assembly. In addition, the reflection sheet and the lower structure have different thermal expansion/shrinkage coefficients, which causes noise to be produced at a junction area between the reflection sheet and the lower structure due to thermal deformation.

SUMMARY

Embodiments of the present invention provide a backlight assembly, in which a reflection sheet is inserted into a recess of a receiving frame having at least one recess and thus the reflection sheet can be fixed without using a separate adhesive, and an LCD device having the backlight assembly.

Embodiments of the present invention also provide a backlight assembly capable of improving the assembling efficiency of a refection sheet and reducing noise, and an LCD device having the backlight assembly.

In accordance with an exemplary embodiment, a backlight assembly includes a light source configured to generate light, a reflection sheet spaced apart from the light source to reflect the light from the light source, and a receiving frame having at least one recess portion into which the reflection sheet is inserted.

The recess portion may have a sheet receiving space configured to receive a portion of the reflection sheet and an opening to the sheet receiving space may be provided in a wall of the receiving frame.

The receiving frame may have a plurality of recess portions and the reflection sheet may include an uneven pattern comprising a plurality of protrusions, each protrusion being inserted into a corresponding sheet receiving space of one of the recess portions.

A supporting portion configured to support the reflection sheet may be extended from the wall of the receiving frame having the opening to the sheet receiving space, and may be positioned adjacent the opening. The supporting portion may include a protrusion section extending from and below the opening of the sheet receiving space and an inclined section extending from an end of the protrusion section downwardly and diagonally.

The backlight assembly may further include an optical plate disposed above the protrusion section.

The supporting portion may include at least one fixing projection configured to fix the reflection sheet, and the reflection sheet may include at least one fixing hole corresponding to the fixing projection.

The backlight assembly may further include at least one sheet fixing member configured to fix the reflection sheet, the sheet fixing member being inserted into the sheet receiving space to contact and fix reflection sheet.

The recess portion may include a protrusion type-fixing portion protruding from an inside surface of the sheet receiving space.

A cross section of the sheet receiving space may have at least one of a straight shape, a curved shape, an oblique shape, and a combination thereof.

A width of the sheet receiving space may gradually decrease in a direction toward an inner portion of the sheet receiving space.

The recess portion may include a sheet receiving space with a plurality of openings and the reflection sheet may include an uneven pattern configured to be inserted into the sheet receiving space through the openings.

The backlight assembly may further include a lamp fixing frame configured to fix the light source and to be coupled to the receiving frame, and an optical film unit supported by the lamp fixing frame and the receiving frame.

The backlight assembly may further include a bottom plate contacting or coupled to bottom surfaces of the coupled receiving frame and lamp fixing frame.

In accordance with an exemplary embodiment, a liquid crystal display device includes a backlight assembly and a liquid crystal display panel. The backlight assembly includes a light source configured to generate light, a reflection sheet spaced apart from the light source to reflect the light from the light source, and a receiving frame having at least one recess portion into which the reflection sheet is inserted. The liquid crystal display panel displays an image using the light from the backlight assembly.

The recess portion may have a sheet receiving space configured to receive a portion of the reflection sheet and an opening to the sheet receiving space may be provided in a wall of the receiving frame.

The receiving frame may have a plurality of recess portions, and the reflection sheet may include a plurality of protrusions, each protrusion being inserted into a corresponding sheet receiving space of one of the recess portions.

A supporting portion configured to support the reflection sheet may be extended from the wall of the receiving frame having the opening to the sheet receiving space, and may be positioned adjacent the opening. The supporting portion may include at least one fixing projection configured to fix the reflection sheet, and the reflection sheet may include at least one fixing hole corresponding to the fixing projection.

The liquid crystal display device may further include at least one sheet fixing member configured to fix the reflection sheet, the sheet fixing member being inserted into the sheet receiving space receiving the reflection sheet to contact and fix the reflection sheet.

A cross section of the sheet receiving space may have at least one of a straight shape, a curved shape, an oblique shape, and a combination of the straight shape, a curved shape, and an oblique shape.

A width of the sheet receiving space may gradually decrease in a direction toward an inner portion of the sheet receiving space.

BRIEF DESCRIPTION OF THE DRAWINGS

Exemplary embodiments of the present invention can be understood in more detail from the following description taken in conjunction with the accompanying drawings, in which.

DETAILED DESCRIPTION OF EMBODIMENTS

Hereinafter, exemplary embodiments will be described in detail with reference to the accompanying drawings.

Figure 1:
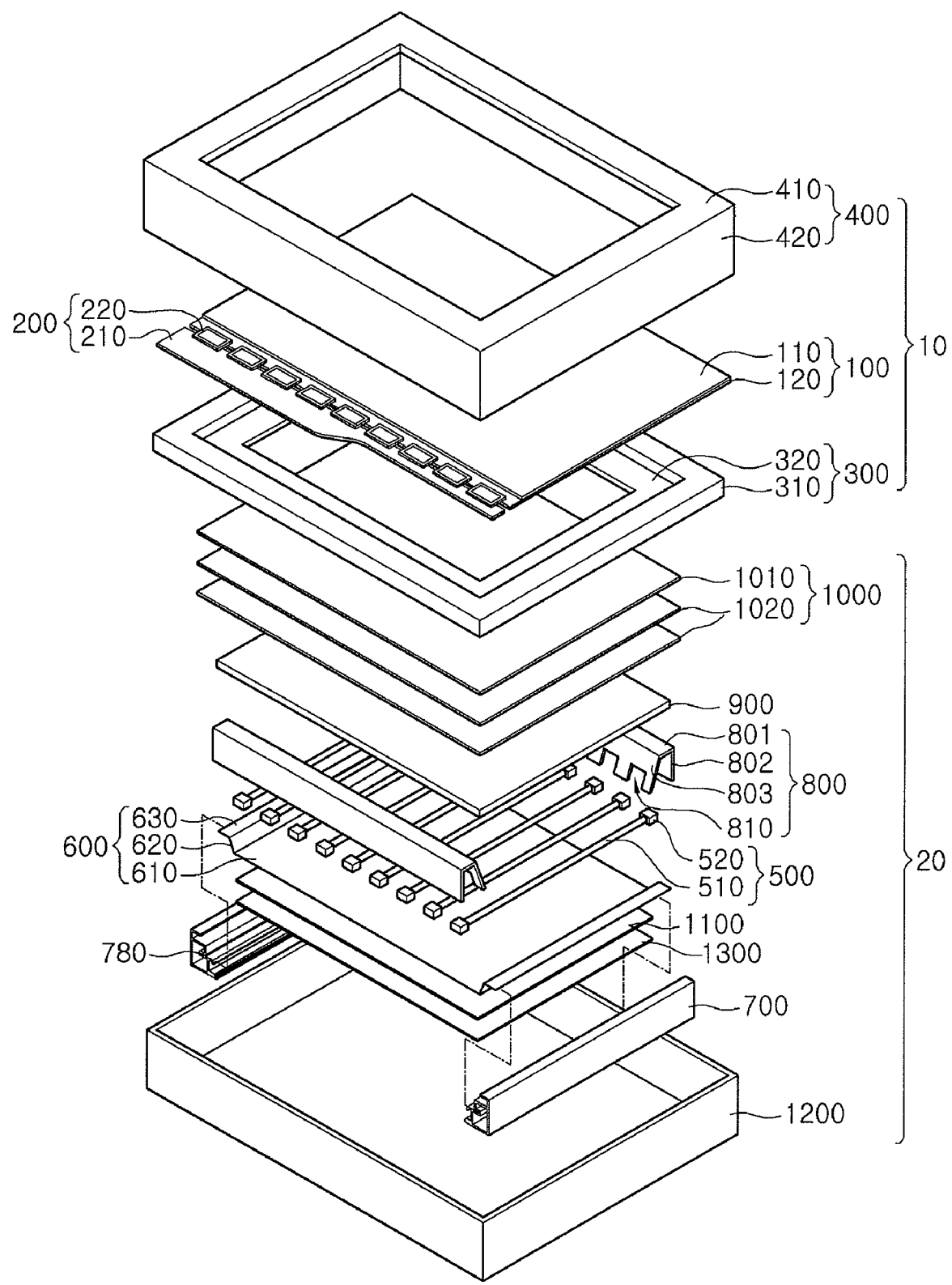
FIG. 1 is an exploded perspective view of a liquid crystal display device (LCD) in accordance with an exemplary embodiment.
Figure 2:
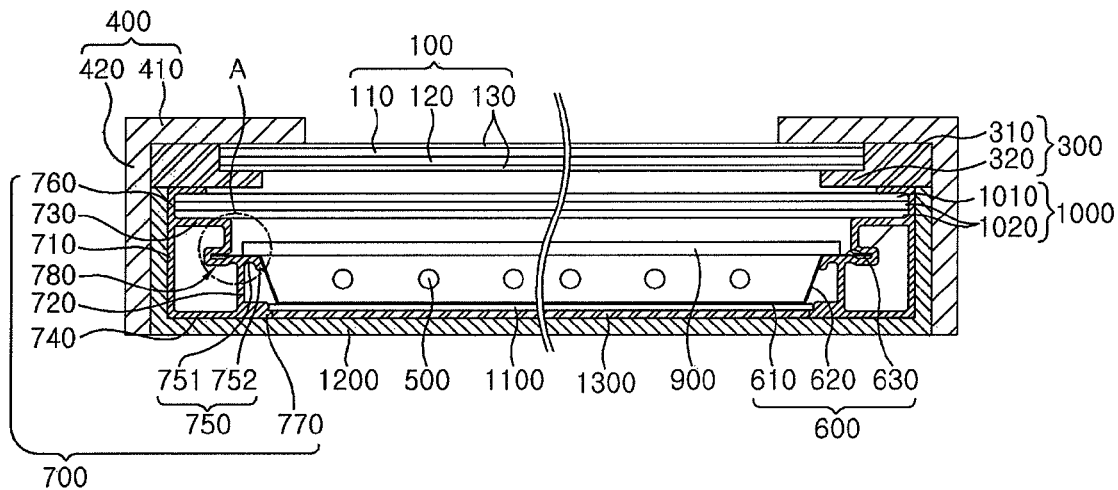
FIG. 2 is a cross-sectional view of the LCD shown in FIG. 1 in accordance with an exemplary embodiment.
Figure 3:
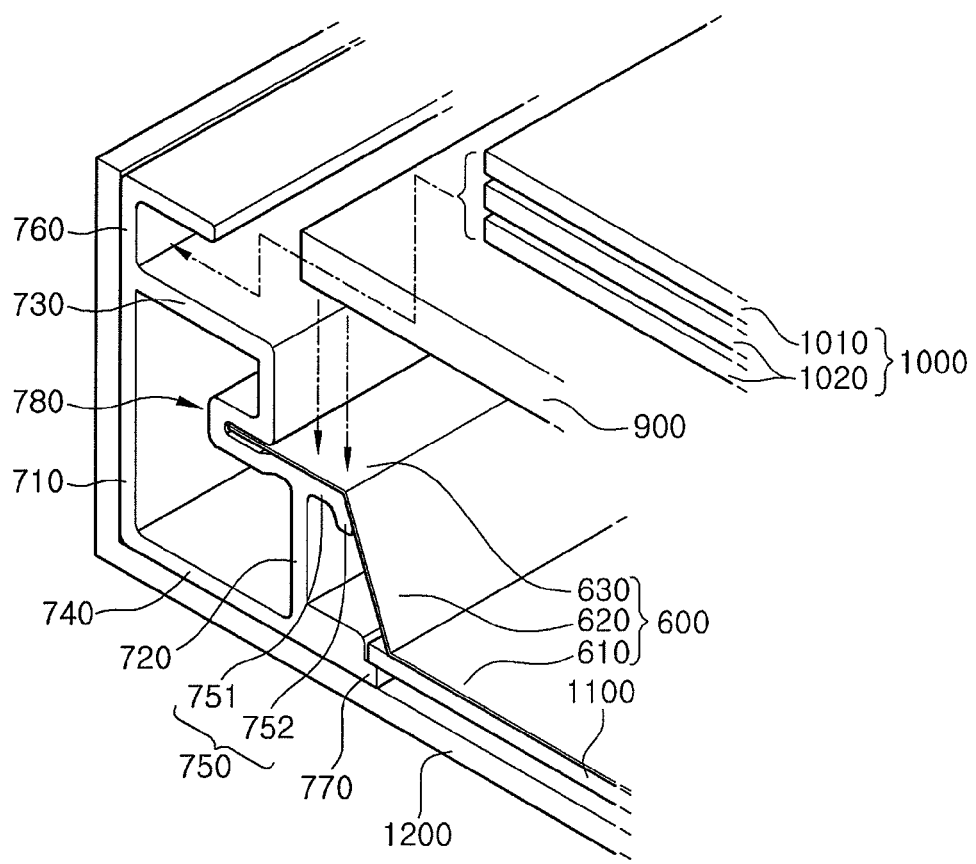
FIG. 3 is an exploded cross-sectional perspective view of a portion of a backlight assembly in accordance with an exemplary embodiment.
Figure 4:
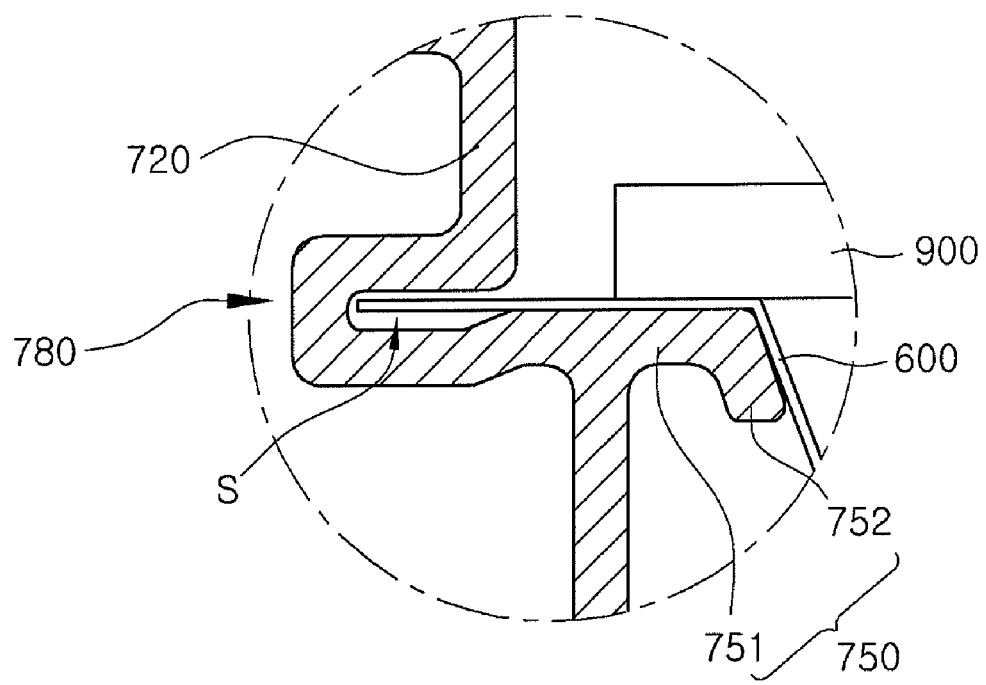
FIG. 4 is an enlarged cross-sectional view of an area A of FIG. 2 in accordance with an exemplary embodiment.

FIG. 1 is an exploded perspective view of a liquid crystal display device (LCD) in accordance with an exemplary embodiment. FIG. 2 is a cross-sectional view of the LCD shown in FIG. 1 in accordance with an exemplary embodiment. FIG. 3 is an exploded cross-sectional perspective view of a portion of a backlight assembly in accordance with an exemplary embodiment. FIG. 4 is an enlarged cross-sectional view of an area A of FIG. 2 in accordance with an exemplary embodiment. FIGS. 5 through 9 are enlarged cross-sectional views of recesses in accordance with exemplary embodiments.

Referring to FIGS. 1 and 2, the LCD includes a display assembly 10 and a backlight assembly 20.

The display assembly 10 includes a liquid crystal display panel 100, a driving circuit unit 200, a panel supporting member 300, and a top receiving member 400.

The liquid crystal display panel 100 includes an upper substrate 110 and a lower substrate 120. A color filter and a common electrode are formed on the upper substrate 110. A thin film transistor (TFT) and a pixel electrode are formed on the lower substrate 120. A liquid crystal layer is provided between the upper and lower substrates 110 and 120.

A light shielding pattern and R, G, B color filters are formed on the upper substrate 110. The R, G, B color filters cause the display of predetermined colors when light is transmitted. The common electrode is provided on the light shielding pattern and the color filters, and formed of a transparent conductor, for example, indium tin oxide (ITO) or indium zinc oxide (IZO). The light shielding pattern and the color filters may also be formed on the bottom substrate 120.

The lower substrate 120 includes a plurality of pixel electrodes arranged in a matrix form and a plurality of TFTs each connected to the corresponding pixel electrode. The source terminal and gate terminal of the TFT are connected to a data line and a gate line, respectively.

When a turn-on voltage is applied to the gate line, a TFT connected to the gate line is turned on. If an image signal is supplied to a data line, the image signal of the data line is charged in the pixel electrode through the turn-on TFT. Thus, an electric field is formed between the pixel electrode of the lower substrate 120 and the common electrode of the upper substrate 110, thereby changing orientations of liquid crystal molecules therebetween. As the orientations of the liquid crystal molecules are changed, light transmittance is changed. Through the above-described processes, a desired image is displayed.

As illustrated in FIG. 2, a polarization sheet 130 may be disposed on each of the top surface of the upper substrate 110 and the bottom surface of the lower substrate 120.

The driving circuit unit 200 is electrically connected to the liquid crystal display panel 100. The driving circuit unit 200 mounts a control integrated circuit (IC) thereon and includes a printed circuit board 210 that supplies a predetermined signal to the data line and the gate line. Although not shown, the printed circuit board 210 includes a voltage generator (not shown) for generating an internal voltage, a gray scale voltage generator for generating a gray scale voltage, a data driver for supplying an image signal to the data line, and a gate driver for applying a turn-on voltage to the gate line. The gate driver may be formed on the lower substrate 120. In this case, a controller for controlling the gate driver may be further formed on the printed circuit board 210. The printed circuit board 210 is electrically connected to the lower substrate 120 through a flexible printed circuit board 220. The data driver is manufactured in an IC chip form and mounted on the printed circuit board 210. The data driver in an IC chip form may be mounted on the flexible printed circuit board 220. Components mounted on the printed circuit board 210 may be mounted on the lower substrate 120.

The panel supporting member 300 supports the liquid crystal display panel 100. The panel supporting member 300 is manufactured in a hollow quadrilateral frame shape. As illustrated in FIG. 1, the panel supporting member 300 includes a hollow frame body 310 and a protrusion 320. The protrusion 320 protrudes toward the internal space of the frame body 310 from a lower portion of the inner wall of the frame body 310. The protrusion 320 supports the liquid crystal display panel 100. That is, the liquid crystal display panel 100 is disposed on the protrusion 320. The inner wall of the frame body 310 above the protrusion 320 fixes the liquid crystal display panel 100. That is, the inner wall of the frame body 310 surrounds the sides of the liquid crystal display panel 100 to prevent the liquid crystal display panel 100 from moving in right-and-left and up-and-down directions. The frame body 310 and the protrusion 320 may be integrally formed. The panel supporting member 300 may be manufactured through a pressing process or a molding process. The panel supporting member 300 may be formed of a resin, for example, plastic.

The top receiving member 400 receives the liquid crystal display panel 100, the panel supporting member 300, and the backlight assembly 20. The top receiving member 400 may be coupled and fixed to the backlight assembly 20. The top receiving member 400 includes a hollow quadrilateral plate 410 and a lateral portion 420 extending from the edge of the quadrilateral plate 410. The liquid crystal display panel 100, the panel supporting member 300, and the backlight assembly 20 are received in an interior space defined by the quadrilateral plate 410 and the lateral portion 420. As a result, these components are not disengaged from the top receiving member 400 and are protected against external shocks. The top receiving member 400 may be formed of a strong metal that is lightweight and resists deformation.

The backlight assembly 20 includes a lamp unit 500 (i.e., light source), a reflection sheet 600, and a receiving frame 700. The lamp unit 500 emits light. The reflection sheet 600 reflects the light from the lamp unit 500. The receiving frame 700 includes at least one recess 780 for fixing the reflection sheet 600. The backlight assembly 20 may further include a lamp fixing frame 800 for fixation of the lamp unit 500, an optical plate, for example, a heat shielding plate 900 disposed on the lamp unit 500, and an optical film unit 1000. The optical plate may be formed of a light transmitting plate capable of diffusing light and/or shielding heat. In this embodiment, the heat shielding plate 900 serves as the optical plate. A bottom plate 1300 is further provided and coupled to the bottom surfaces of the receiving frame 700 and the lamp fixing frame 800. The receiving frame 700, the lamp fixing frame 800 and the bottom plate 1300 define a receiving space. The receiving space receives the lamp unit 500 and the reflection sheet 600. To increase efficiency, a heat diffusing plate 1100 is disposed between the reflection sheet 600 and the bottom plate 1300. The heat diffusing plate 1100 may be omitted. Also, the backlight assembly 20 may further include a bottom receiving member 1200 for receiving the lamp unit 500, the reflection sheet 600, the receiving frame 700, the lamp fixing frame 800, the heat shielding plate 900, and the optical film unit 1000. The bottom receiving member 1200 may be omitted.

As illustrated in FIG. 1, the lamp unit 500 includes a plurality of lamps 510 and a plurality of lamp holders 520 for supporting the lamps 510. Alternatively, the lamp unit 500 may include a lamp provided at one side thereof and a light guide plate for guiding light from the lamp to the optical film unit 1000. In the lamp unit 500, i.e., a light source, all or part of the lamps 510 emit light.

In this embodiment, the lamps 510 may be disposed at regular intervals, as illustrated in FIG. 1. The lamps 510 may be disposed perpendicularly to the longitudinal direction of the bottom receiving member 1200, which can reduce the length of the lamps 510. As such, a greater number of lamps 510 can be provided than a number provided in a direction parallel to the longitudinal direction of the bottom receiving member 1200. It is thus possible to improve the brightness of the backlight assembly 20. In this embodiment, the lamp 510 may include a cold cathode fluorescent lamp (CCFL). However, the lamp 510 is not limited to the above-mentioned example, and various lamps, for example, a light emitting diode (LED) lamp, can be used as the lamp 510. The LED lamp includes a substrate mounted with a plurality of light emitting diodes (LEDs).

The lamp holders 520 are provided at the both ends of the lamps 510. The lamp holders 520 include electrode terminal areas. The lamp holders 520 are fixed by the lamp fixing frame 800, which fixes the lamps 510 to the backlight assembly 20. The lamp holders 520 may be formed in a bar shape to support the both ends of each lamp 510. In this embodiment, the lamps 510 are formed in an I-shape as illustrated in FIG. 1. However, the lamps 510 are not limited to the I-shape, and can be formed into various shapes, for example, a U-shape, an N-shape, an M-shape, and a meander shape. The lamp unit 500 may further include a connector electrically connected to the lamps 510.

The lamp fixing frame 800 fixes the lamp unit 500 to the bottom receiving member 1200. For this purpose, the lamp fixing frame 800 includes a fixing slot 810. As illustrated in FIG. 1, the lamp fixing frame 800 includes a top wall 801, an outer wall 802, and an inner wall 803. The outer wall 802 is perpendicular or substantially perpendicular to the floor of the bottom receiving member 1200, and the inner wall 803 is inclined with respect to the floor of the bottom receiving member at a predetermined angle. Accordingly, the inclined inner wall 803 can guide light, which is emitted toward the inner wall 803, to the optical film unit 1000. The heat shielding plate 900 may be fixed to the inner wall 803. In this case, a raised portion may be formed on the inner wall 803 to support the heat shielding plate 900.

The outer wall 802 is pressed against a sidewall of the bottom receiving member 1200. When the bottom receiving member 1200 does not have a sidewall, the outer wall 802 can serve as the sidewall thereof. The fixing slot 810 for fixing the lamp unit 500 is formed at the inner wall 803. The fixing slot 810, as illustrated in FIG. 1, is defined as an upward recess into a portion of the lower region of the inner wall 803. The number of fixing slots 810 may be equal to the number of lamps 510. For fixation of the lamp unit 500, the lamp holders 520 of the lamp unit 500 are inserted into a plurality of fixing slots 810. In this embodiment, the lamp fixing frame 800 is provided at each of the both ends of the lamps 510, respectively. The length of the lamp fixing frame 800 may be equal to the longitudinal length of the bottom receiving member 1200. The bottom receiving member 1200 is formed in a substantially rectangular shape and the lamp fixing frame 800 is formed in a bar shape, e.g., a straight shape, with a predetermined thickness. The lamp fixing frame 800 is disposed at each of two side surfaces of the bottom receiving member 1200, respectively, where the lamp holders 520 are located. The lamp fixing frame 800 may be formed of a plurality of blocks.

The reflection sheet 600 is provided in a lower region and a portion of a side region of the lamp unit 500. As illustrated in FIGS. 1 and 2, the reflection sheet 600 includes a flat portion 610, an inclined portion 620 extending upward and outward from an edge of the flat portion 610, and a fixing portion 630 extending laterally from the edge of the inclined portion 620. The reflection sheet 600 upwardly reflects light, which is emitted from the lamp unit 500 and propagates the light in downward and lateral directions except for an upward direction (i.e., the direction of the optical film unit 1000). The flat portion 610 is disposed adjacent to the floor of the bottom receiving member 1200. The inclined portion 620 has a predetermined slope. At least part of the fixing portion 630 is supported by the receiving frame 700.

The receiving frame 700 is formed in a hollow pipe shape. At least one recess 780 is disposed at a side of the receiving frame 700 to fix the reflection sheet 600. The reflection sheet 600 is inserted into the recess 780, and thus is fixed.

The receiving frame 700, as illustrated in FIG. 3, includes an outer wall 710, an inner wall 720, a top wall 730, and a bottom wall 740. Specifically, the outer wall 710 and the inner wall 720 are formed perpendicularly to the bottom wall 740.

The outer and inner walls 710, 720 are positioned opposite each other. The bottom wall 740 links the bottom of the outer wall 710 with the bottom of the inner wall 720. The top wall 730 links the top of the outer wall 710 with the top of the inner wall 720.

Also, the receiving frame 700 includes a first supporting portion 750 extending from a portion of the inner wall 720 and a second supporting portion 760 extending from a portion of the top wall 730. The receiving frame 700 may further include a third supporting portion 770 extending from the bottom of the inner wall 720. The recess 780 may be provided at the inner wall 720. As illustrated in FIGS. 3 and 4, a portion of the inner wall 720 is recessed toward the inner space of the receiving frame 700 to form the recess 780. As illustrated in FIG. 4, the recess 780 includes a sheet receiving space S into which the reflection sheet 600 is inserted. An opening to the sheet receiving space S is provided at the inner wall 720. The first supporting portion 750 may be positioned adjacent to the opening to the sheet receiving space S.

The bottom receiving member 1200 is formed in a substantially rectangular shape and the receiving frame 700 is formed in a substantially bar shape, i.e., a straight shape with a predetermined thickness. The receiving frame 700 is disposed having a length along each of the short sidewalls of the bottom receiving member 1200, respectively. The length of the receiving frame is greater than its width. The outer wall 710 may be pressed against the short sidewall of the bottom receiving member 1200 and the bottom wall 740 may be pressed against the floor of the bottom receiving member 1200. The outer wall 710 can serve as the sidewall of the bottom receiving member 1200.

As illustrated in FIG. 2, the optical film unit 1000 is disposed on the top wall 730, and the second supporting portion 760, which extends upward from the top wall 730, fixes the optical film unit 1000. The second supporting portion 760 includes a vertical section vertically extending from the top wall 730 and a horizontal section horizontally extending from the upper end of the vertical section. The horizontal section prevents the optical film unit 1000 from being dislodged. The panel supporting member 300 is received on the second supporting portion 760. A separate combining member may be provided between the second supporting portion 760 and the panel supporting member 300 to couple them to each other.

As illustrated in FIG. 4, the inner wall 720 is divided into a plurality of portions, and the portions may not be aligned with each other.

The inner wall 720 includes the first supporting portion 750, the third supporting portion 770, and the recess 780.

The third supporting portion 770 protrudes from a lower portion of the inner wall 720 and is formed in a step shape. The heat diffusing plate 1100 is received on the third supporting portion 770. Alternatively, the third supporting portion 770 can be omitted. For example, when the heat diffusing plate 1100 is directly received on the floor of the bottom receiving member 1200, the third supporting portion may be omitted.

The first supporting portion 750 includes a protrusion section 751 protruding perpendicular to the inner wall 720 and an inclined section 752 extending obliquely downward from the end of the protrusion section 751. The protrusion section 751 is pressed against a part of the fixing portion 630 of the reflection sheet 600. The heat shielding plate 900 is disposed on the protrusion section 751. The protrusion section 751 supports the fixing portion 630 of the reflection sheet 600 and the heat shielding plate 900. The reflection sheet 600 and the heat shielding plate 900 may be sequentially stacked on the protrusion section 751, thereby fixing the reflection sheet 600. The pressure exerted by the heat shielding plate 900 on the protrusion section 751 presses the fixing portion 630 of the reflection sheet 600, and fixes the reflection sheet 600. The inclined section 752 comes in close contact with a part of an inclined portion 620 of the reflection sheet 600. The slope of the inclined portion 620 may be adjusted according to the slope of the inclined section 752. As illustrated in FIGS. 2 and 3, the inclined section 752 extends so as to closely contact with an upper part of the inclined portion 620. Alternatively, the inclined section 752 may extend without restriction on its size to contact more than an upper part of the inclined portion 620. As illustrated in FIGS. 2 and 3, the first supporting portion 750 may be formed above the third supporting portion 770 because the first supporting portion 750 supports the reflection sheet 600 and the third supporting portion 770 supports the heat diffusing plate 1100 disposed under the reflection sheet 600. A position at which the first supporting portion 750 is formed may be appropriately adjusted according to the size of the lamp 510 and a distance between the reflection sheet 600 and the heat shielding plate 900. If the height of the inner wall 720 is 1, the first supporting portion 750 may be formed at approximately 0.6 to approximately 0.9 from the lower end of the inner wall 720, i.e., at a location about 60% to about 90% along the height of the inner wall 720.

The recess 780 is formed adjacent to the first supporting portion 750. As illustrated in FIG. 4, a lower part of the opening to the sheet receiving space S in the recess 780 may be positioned to be aligned with a height at which the protrusion section 751 of the first supporting portion 750 is formed. As illustrated in FIG. 4, a cross section of the sheet receiving space S in the recess 780 has a substantially straight shape.

As illustrated in FIGS. 2 through 4, the fixing portion 630 of the reflection sheet 600 is inserted into the sheet receiving space S of the recess 780. Because the fixing portion 630 is inserted into the sheet receiving space S, the reflection sheet 600 can be fixed to the receiving frame 700 without using a separate adhesive. A portion of the reflection sheet 600 is inserted into the sheet receiving space S of the recess 780, and as a result the reflection sheet 600 is prevented from being dislodged. Also, the pressure exerted by the heat shielding plate 900 on the first supporting portion 750 presses the reflection sheet 600 so that movement of the reflection sheet 600 is prevented. In a backlight assembly assembling process, it is sufficient to insert a portion of the backlight assembly 600 into the recess 780 to prevent the reflection sheet 600 from being disengaged and unfastened. Thus, the mounting process of the reflection sheet 600 can be simplified. When the reflection sheet 600 is enlarged and shrunken due to environmental conditions, such as from heat generated by the lamp unit 500, the sheet receiving space S provides space to accommodate the enlargement and shrinkage of the reflection sheet 600.

Figure 5:
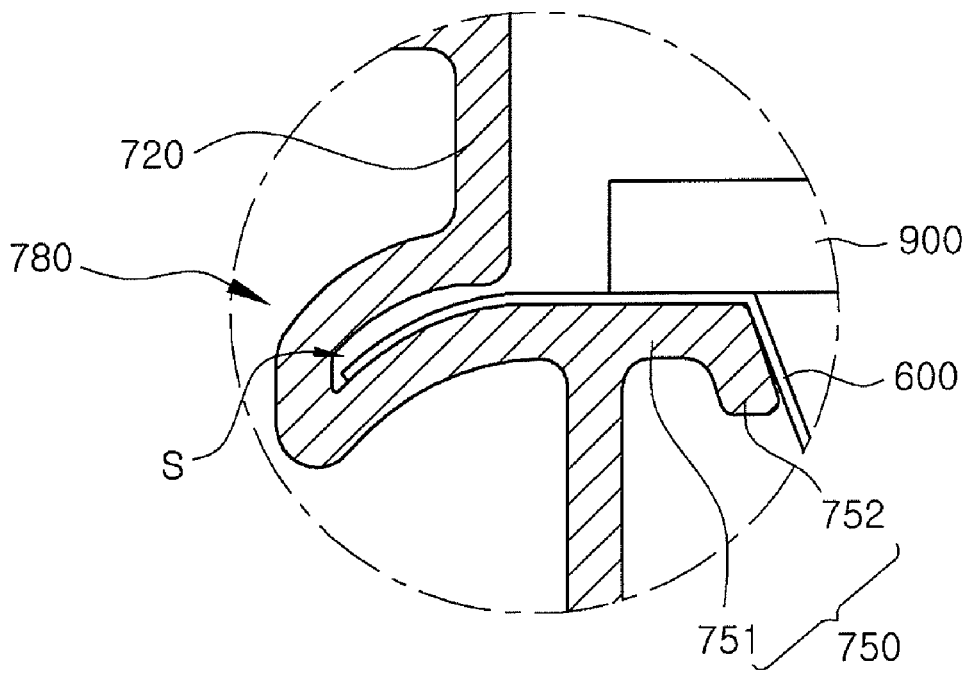
FIGS. 5 through 9 are enlarged cross-sectional views of recesses in accordance with exemplary embodiments.
Figure 6:
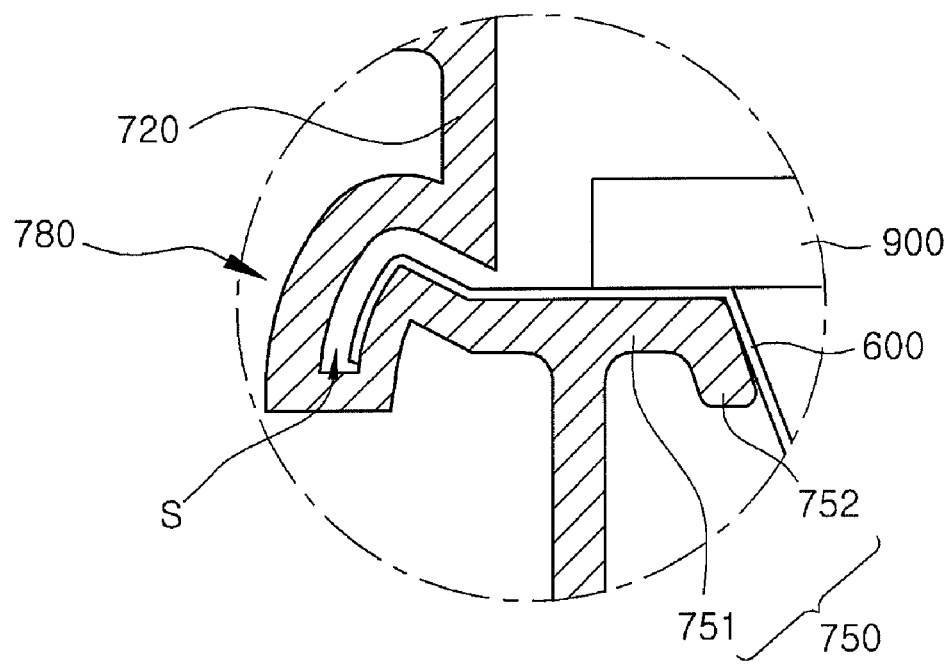
Figure 7:
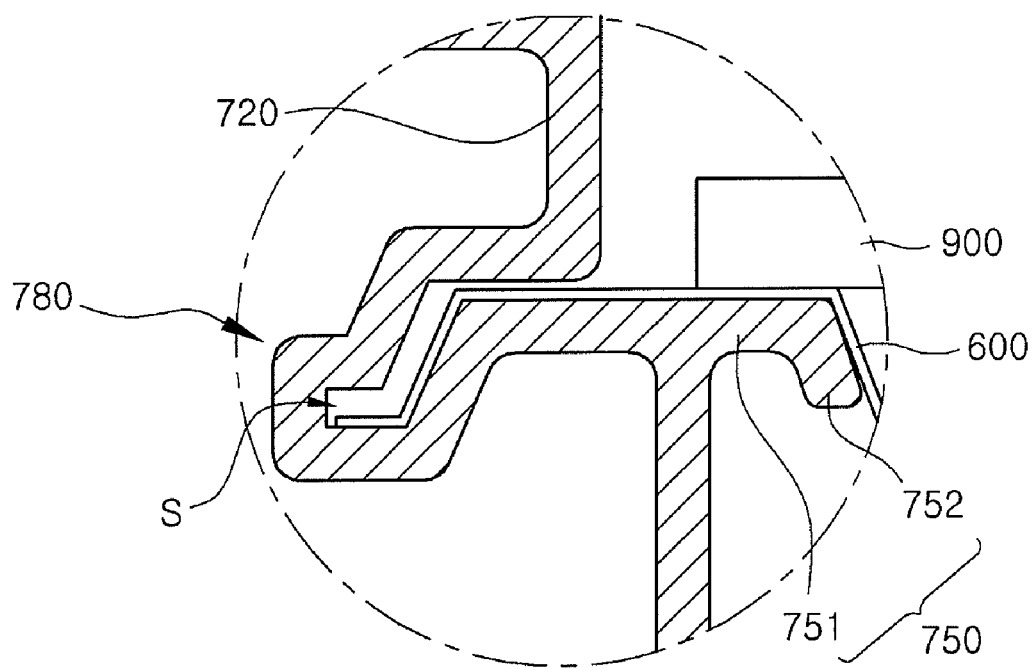

The cross section of the sheet receiving space S is not limited to the straight shape as illustrated in FIG. 4. That is, the cross section of the sheet receiving space S may have various shapes so as to fix the reflection sheet 600. As illustrated in FIG. 5, a cross section of a sheet receiving space S in the recess 780 may have a curved shape. Further, the cross section of the sheet receiving space S may have an oblique shape. Specifically, as illustrated in FIG. 5, the cross section of the sheet receiving space S has a downwardly curved shape at an oblique angle. However, the embodiments of the present invention are not limited to such a shape, and the cross section may have an upwardly curved shape. As illustrated in FIG. 6, a cross section of a sheet receiving space S may have, but is not limited to, an inverted V-shape. Alternatively, the cross section of the sheet receiving space S may have an S-shape. In the case that the cross section of the sheet receiving space S has a bent-shape, the reflection sheet 600 can be firmly fitted in the recess and its movement is further restricted. In the sheet receiving space S with the inverted V-shape as illustrated in FIG. 6, if an upper vertex portion of the inverted V-shape is flat, insertion of the reflection sheet 600 into the sheet receiving space S can be facilitated. Also, as illustrated in FIG. 7, a cross section of a sheet receiving space S can have, but is not limited to, a shape combining straight and oblique portions. For example, the cross section of the sheet receiving space S can be long and include a number of different curves and straight portions, or a shape combining a straight shape, an oblique shape, and a curved shape. As described above, the cross section of the sheet receiving space S may have a shape combining a straight shape and an oblique shape so as to bend a portion of the reflection sheet 600 inserted into the sheet receiving space S.

Figure 8:
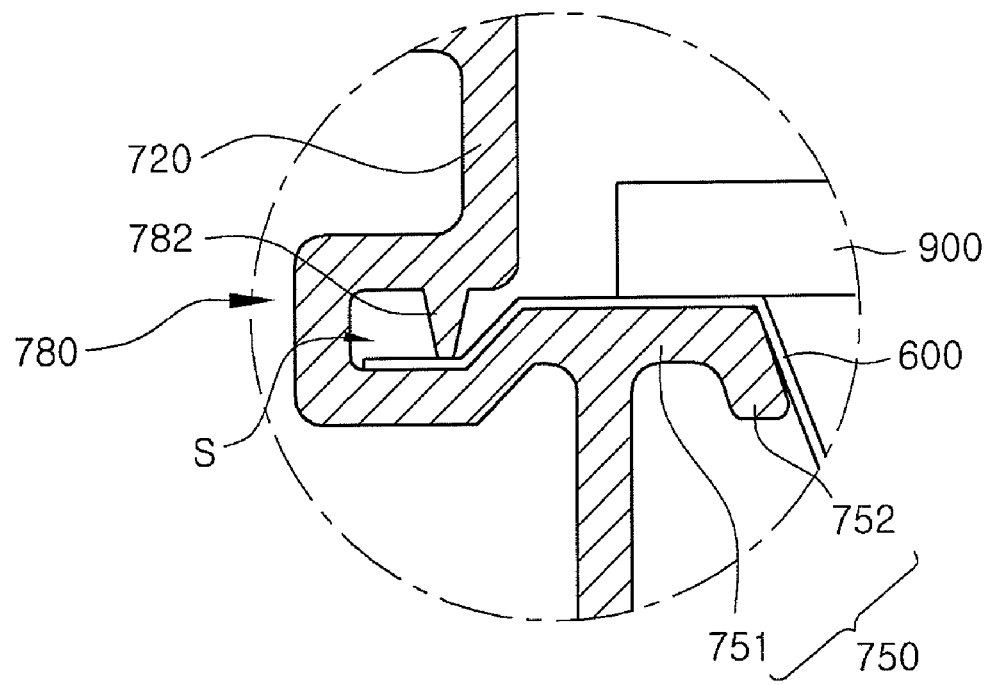
Figure 9:
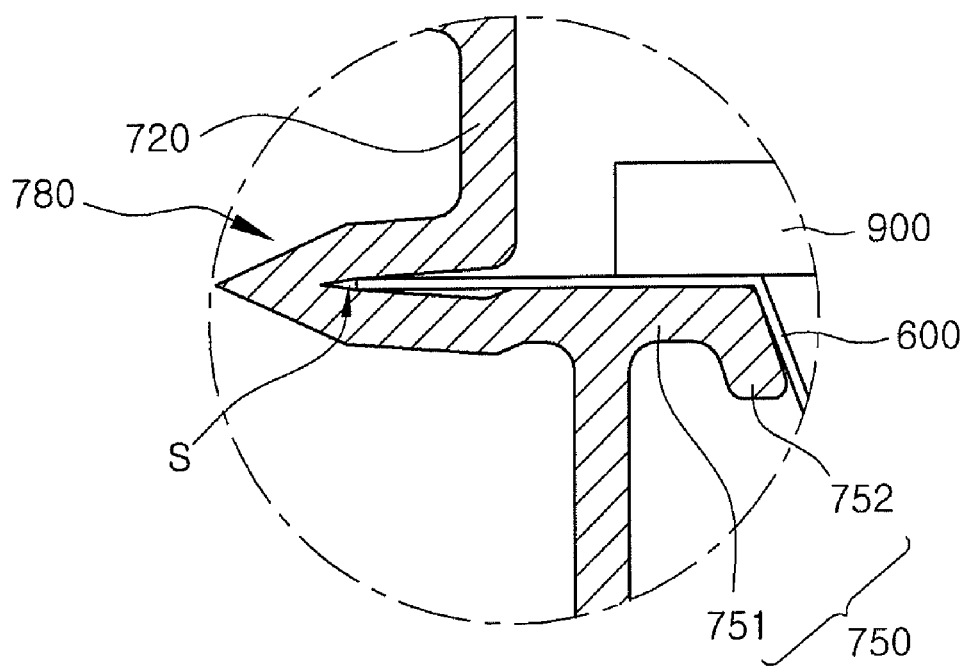

In addition, as illustrated in FIG. 8, a protrusion type-fixing portion 782 for fixing the reflection sheet 600 may be provided inside the recess 780. The fixing portion 782 protrudes into the sheet receiving space S from a portion of the internal surface of the recess 780. The height of the sheet receiving space S may be decreased by the fixing portion 782 so that the height is similar to the thickness of the reflection sheet 600. For example, the height of the sheet receiving space S at the position of the fixing portion 782 may be equal to or between approximately 1% to approximately 30% more than the thickness of the reflection sheet 600. The fixing portion 782 can prevent movement of the reflection sheet 600 inserted into the sheet receiving space S by pressing the reflection sheet 600. FIG. 8 illustrates a downward protruding fixing portion 782. Alternatively, the fixing portion 782 may protrude upward. Also, a plurality of fixing protrusions that include, for example, an upward fixing protrusion and a downward fixing protrusion may be formed in the recess 780. Moreover, as illustrated in FIG. 9, a width of a cross-section of the sheet receiving space S may decrease gradually in a direction toward an inner end of the sheet receiving space S. In this case, the minimum height of the sheet receiving space S may be less than the thickness of the reflection sheet 600. As illustrated in FIG. 9, when the reflection sheet 600 is pushed into the sheet receiving space S, the reflection sheet 600 is fitted into the internal surface of the sheet receiving space S and thus up and down movement of the reflection sheet 600 is prevented.

In this embodiment, a reflection sheet 600 with a thickness of less than approximately 1 nm may be fitted in the recess 780, and thus a width of the opening of the recess 780 should be correspondingly small. In order to form the recess 780 with an opening having the small width, the receiving frame 700 may be manufactured through an extrusion process because the extrusion process is suitable for a micro pattern. The receiving frame 700 with the recess 782 may be formed of aluminum. That is, the receiving frame 700 may be an extruded aluminum frame.

The inclined section 752 of the first supporting portion 750 in the receiving frame 700 may extend to be coupled to the third supporting portion 770, and, as a result, an inner wall 720 below the protrusion section 751 may be omitted. In this case, the first supporting portion 750 can serve as the omitted portion of the inner wall 720 and the third supporting portion 770 can serve as part of the bottom wall 740.

The heat diffusing plate 1100 is disposed below the lamp unit 500. As illustrated in FIG. 2, the heat diffusing plate 1100 is disposed below the flat portion 610 of the reflection sheet 600. The heat diffusing plate 1100 diffuses heat from the lamp unit 500 to prevent heat concentration. The heat diffusing plate 1100 may be formed of a material with an excellent heat conductivity so as to rapidly absorb the heat from the lamp unit 500 and discharge the absorbed heat outside.

The heat shielding plate 900 is disposed above the lamp unit 500. The heat shielding plate 900 does not allow the heat from the lamp unit 500 to be transferred to the optical film unit 1000 and the display assembly 10, i.e., the liquid crystal display panel, thereby preventing deterioration of the optical film unit 1000 and the display assembly 10 due to the heat from the lamp unit 500.

The optical film unit 1000 is disposed above the heat shielding plate 900. The optical film unit 1000 includes a luminance enhancing sheet 1010 and at least one diffusing sheet 1020. The luminance enhancing sheet 1010 transmits light propagating in a direction parallel to its transmitting axis and reflects light propagating in other directions. The diffusing sheet 1020 diffuses light from the lamp unit 500 uniformly and widely. The optical film unit 1000 may include more than one diffusing sheet 1020. If necessary, the optical film unit 1000 may include various optical sheets or optical plates to change light characteristics.

The bottom receiving member 1200 includes a receiving space. The bottom receiving member 1200 is formed in a box shape with an open top surface. The receiving space of the bottom receiving member 1200 receives the lamp unit 500, the lamp fixing frame 800, the reflection sheet 600, the receiving frame 700, and the optical film unit 1000. Thus, the release of these components is prevented and they are protected from being damaged due to external shock.

The backlight assembly 20 is not limited to the above-described embodiments, other embodiments can be provided.

Figure 10:
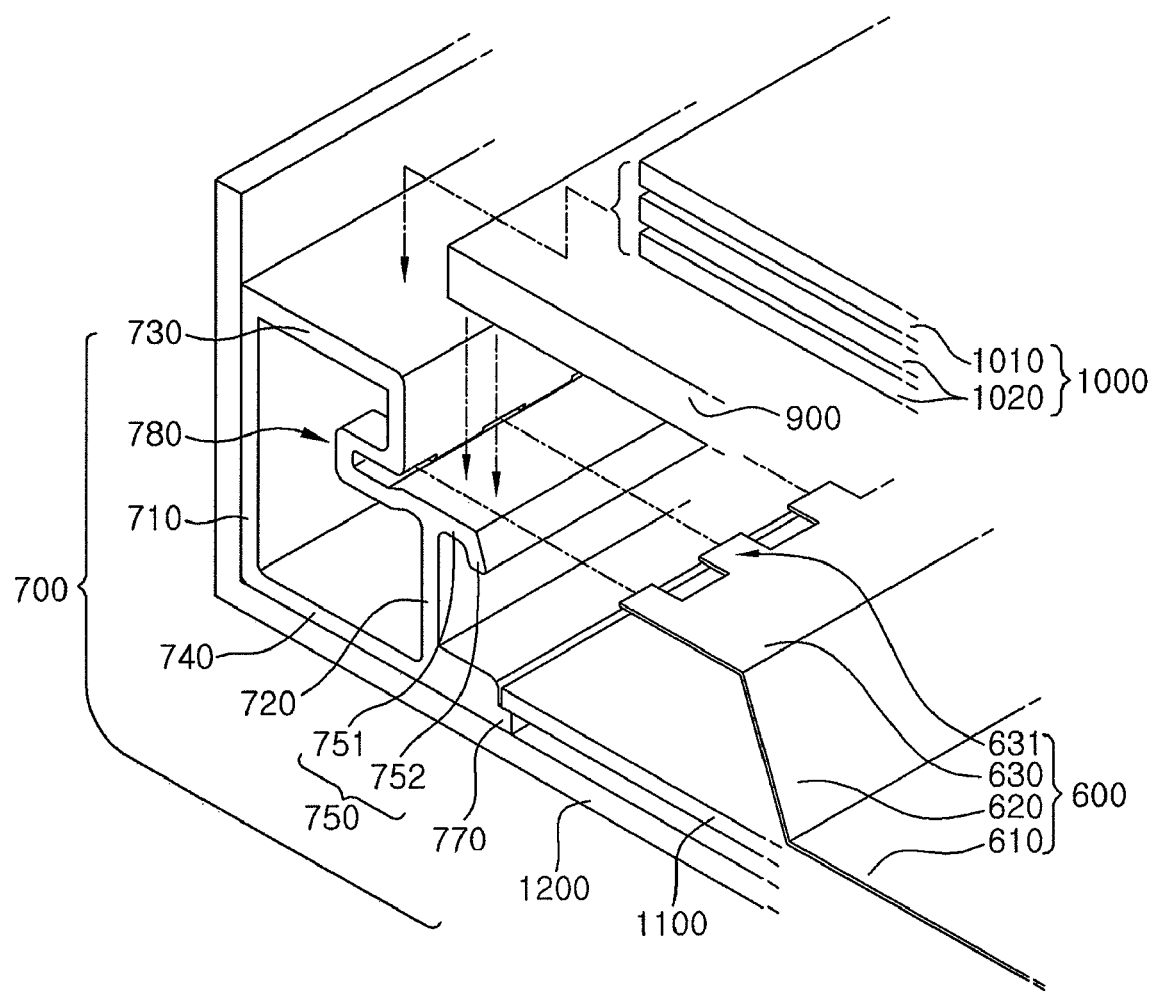
FIG. 10 is an exploded cross-sectional perspective view of a portion of a backlight assembly in accordance with another exemplary embodiment.

FIG. 10 is an exploded cross-sectional perspective view of a portion of a backlight assembly in accordance with an exemplary embodiment.

Referring to FIG. 10, the backlight assembly includes a reflection sheet 600 and a receiving frame 700 for fixing the reflection sheet 600. The receiving frame 700, as illustrated in FIG. 10, includes an outer wall 710, an inner wall 720, a top wall 730, and a bottom wall 740. The receiving frame 700 may include a first supporting portion 750 extending from a portion of the inner wall 720 and a third supporting portion 770 extending from a lower portion of the inner wall 720. The reflection sheet 600 and a heat shielding plate 900 are disposed above the first supporting portion 750. A heat diffusing plate 1100 is disposed above the third supporting portion 770. An optical film unit 1000 is disposed above the top wall 730. The optical film unit 1000 may be fixed by a panel supporting member 300 illustrated in FIG. 1. A stepped portion is formed at a portion of the panel supporting member 300 which contacts the top wall 730, and the optical film unit 1000 may be positioned at the stepped portion of the panel supporting member 300.

In order to fix the reflection sheet 600, a plurality of recesses 780 is formed in the inner wall 720 adjacent the first supporting portion 750. Each of the recesses 780 includes a respective sheet receiving space. Portions of the reflection sheet 600, i.e., end portions of the reflection sheet, are inserted into the sheet receiving spaces, so that movement of the reflection sheet 600 is prevented. Parts of an end portion of a fixing portion 630 in the reflection sheet 600 are inserted into the sheet receiving spaces of the recesses 780. As illustrated in FIG. 10, the recesses 780 are formed on a straight line, i.e., at a point where the inner wall 720 and the first supporting portion 750 meet. The recesses 780 are spaced apart from each other, and thus the fixing portion 630 of the reflection sheet 600 has an uneven pattern 631 corresponding to the spaced recesses 780. That is, protrusions of the fixing portion 630 are inserted into the recesses 780. Specifically, the uneven pattern 631 is formed on an edge area of the fixing portion 630 of the reflection sheet 600 and the protrusions of the uneven pattern 631 are inserted into the respective sheet receiving spaces of the recesses 780, thereby preventing or at least limiting three-dimensional movement of the fixing portion 630, that is, movement in up/down, back/forth and left/right directions. The fixing portion 630 of the reflection sheet 600 may be fitted without using an adhesive. Assembling the reflection sheet 600 is completed by pushing the uneven pattern 631 of the reflection sheet 600 into the sheet receiving spaces of the recesses 780. As described above, since the reflection sheet 600 can be easily assembled, it is possible to simplify an assembling process of the backlight assembly.

Alternatively, the recesses 780 may share a common sheet receiving space and a plurality of respective openings may be linked to the common sheet receiving space. Specifically, a portion of the inner wall 720 is recessed inward to form a recess having a single sheet receiving space and an opening. A plurality of cover patterns are formed to cover part of the opening of the recess, for example, at uniformly spaced intervals. As a result, a recess having a single sheet receiving space and a plurality of openings is formed. The recess can be configured like the recesses 780 described in connection with FIGS. 4-9.

A backlight assembly in accordance with an exemplary embodiment will be described below with reference to related drawings.

Figure 11:
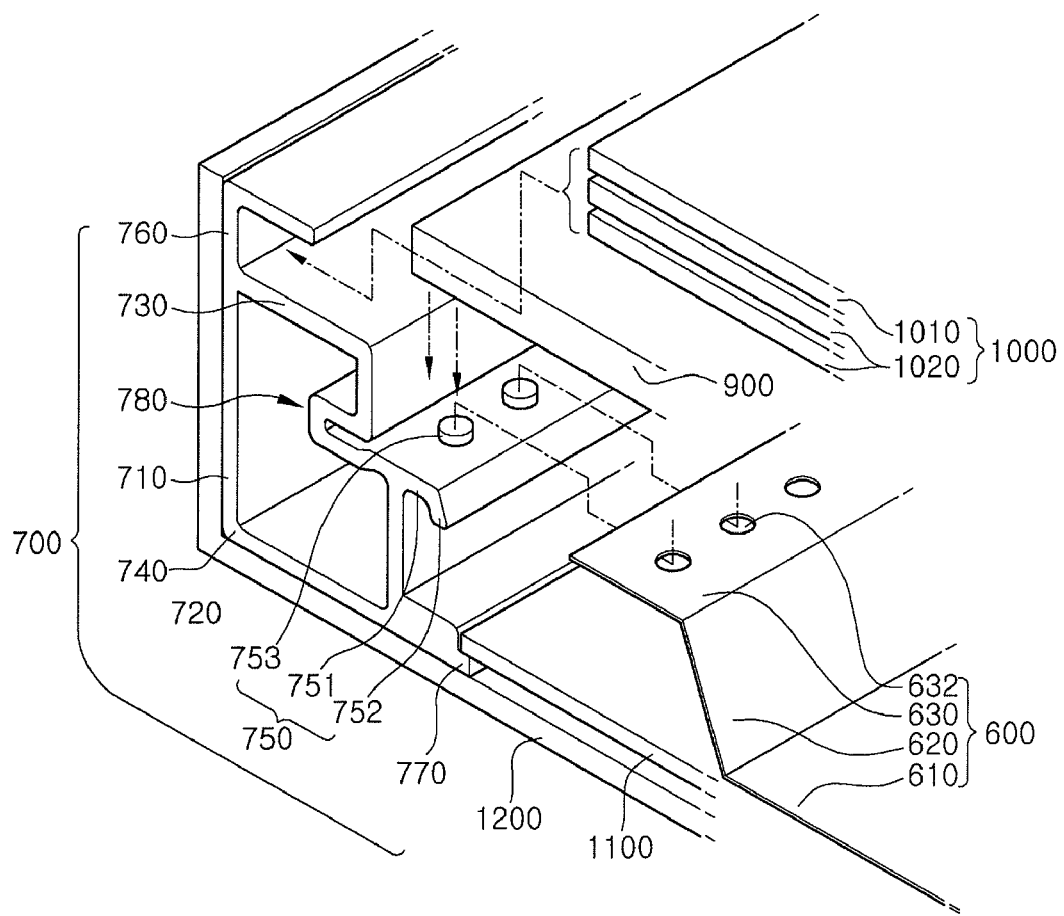
FIG. 11 is an exploded cross-sectional perspective view of a portion of a backlight assembly in accordance with an exemplary embodiment.
Figure 12:
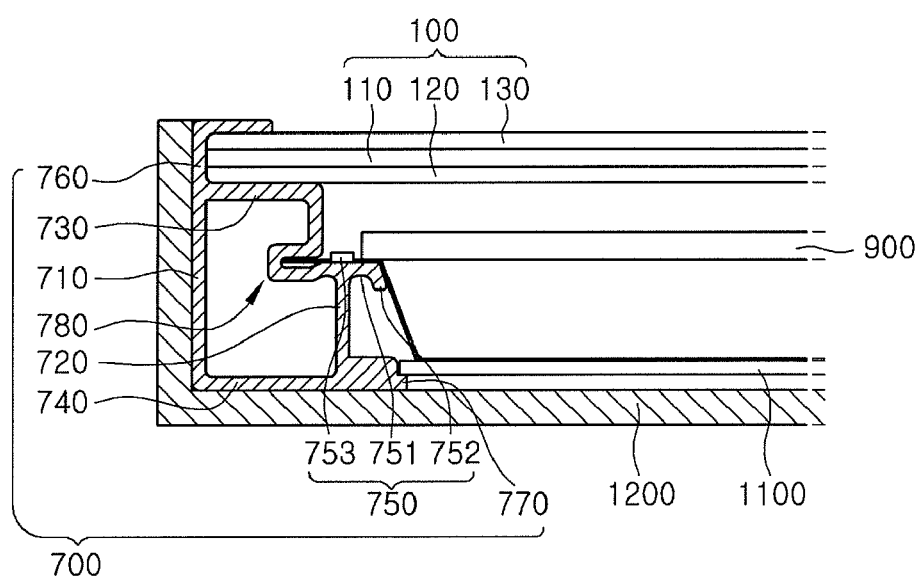
FIG. 12 is a cross-sectional view of a portion of the backlight assembly shown in FIG. 11 in accordance with an exemplary embodiment.

FIG. 11 is an exploded cross-sectional perspective view of a portion of a backlight assembly in accordance with an exemplary embodiment. FIG. 12 is a cross-sectional view of a portion of the backlight assembly in accordance with the exemplary embodiment of FIG. 11.

Referring to FIGS. 11 and 12, the backlight assembly includes a receiving frame 700 for fixing a reflection sheet 600. The receiving frame 700 is formed in a square pillar shape having an outer wall 710, an inner wall 720, a top wall 730, and a bottom wall 740. The inner wall 720 includes a first supporting portion 750 extending from the inner wall 720 outward and a recess 780 being recessed inward. The first supporting portion 750 includes a protrusion section 751 extending perpendicularly to the inner wall 720, an inclined section 752 extending from an end of the protrusion section 751 diagonally and downwardly, and a plurality of fixing projections 753 formed on the protrusion section 751. The recess 780 includes a sheet receiving space for insertion of the reflection sheet 600. In this embodiment, the reflection sheet 600 has a plurality of fixing holes 632 corresponding to the fixing projections 753.

As illustrated in FIGS. 11 and 12, an opening to the sheet receiving space of the recess 780 is formed adjacent to the protrusion section 751 of the first supporting portion 750. When a portion of a fixing portion 630 of the reflection sheet 600 is inserted into the sheet receiving space of the recess 780. The other portion of the fixing portion 630 is placed on the first supporting portion 750. Here, the fixing projections 753 are coupled to the fixing holes 632 of the reflection sheet 600. That is, the fixing projections 753 are inserted into the fixing holes 632. As described above, the portion of the fixing portion 630 of the reflection sheet 600 is inserted into the recess 780 and the fixing projections 753 of the reflection sheet 600 are inserted into the fixing holes 632, which prevent movement of the reflection sheet 600.

As illustrated in FIG. 12, a heat shielding plate 900 is disposed on the protrusion section 751. Here, although not shown, the heat shielding plate 900 also may be fixed by the fixing projections 753 on the protrusion section 751. For this purpose, recesses or holes corresponding to the fixing projections 753 may be formed at an edge area of the heat shielding plate 900. The fixing projections 753 may be integrally formed with the first supporting portion 750. In addition, the fixing projections may be formed through a separate process, and then they may be attached on the first supporting portion 750.

A backlight assembly in accordance with an exemplary embodiment will be described with reference to related drawings.

Figure 13:
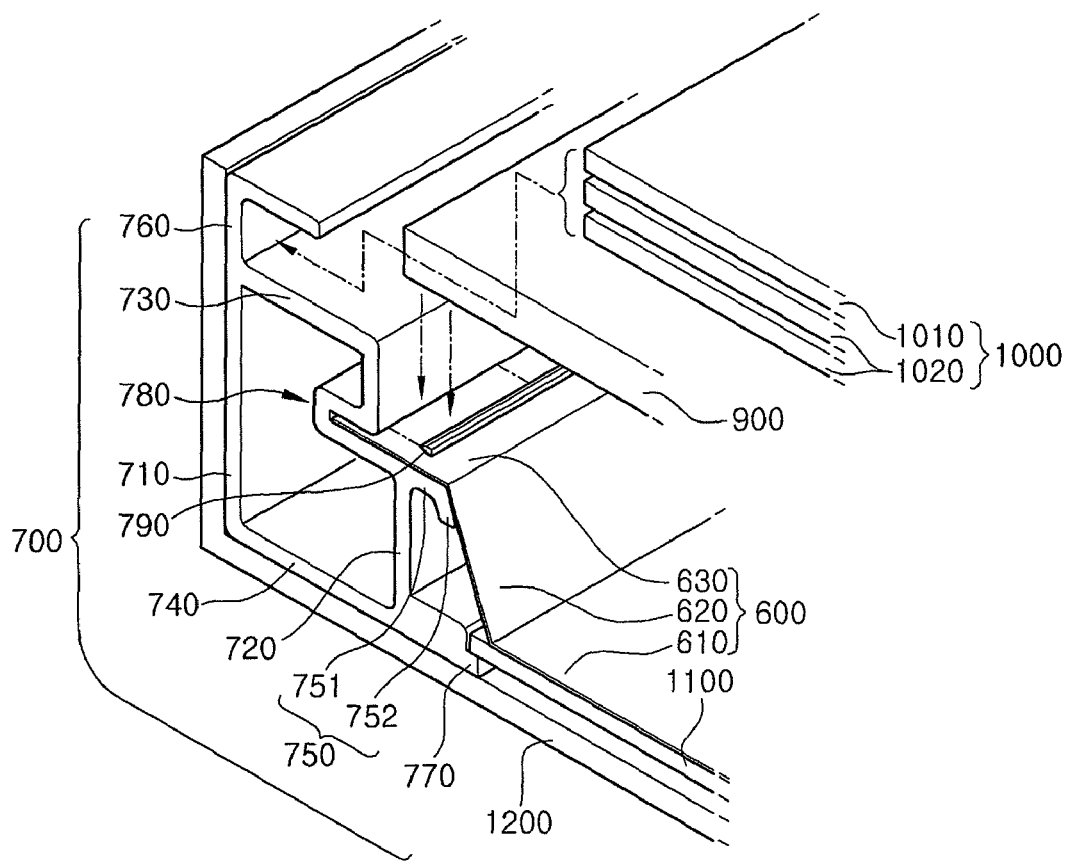
FIG. 13 is an exploded cross-sectional perspective view of a portion of a backlight assembly in accordance with an exemplary embodiment.
Figure 14:
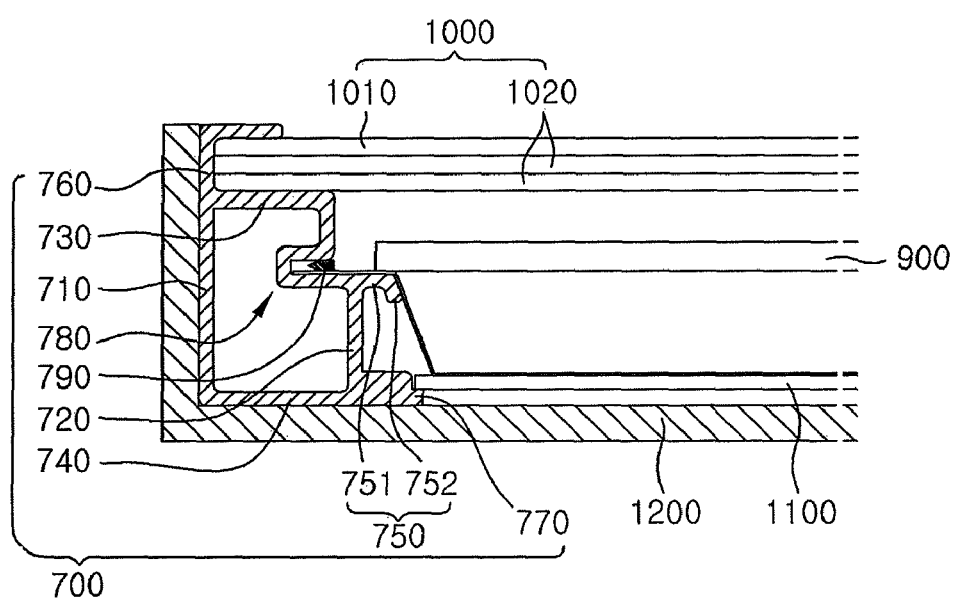
FIG. 14 is a cross-sectional view of a portion of the backlight assembly shown in FIG. 13 in accordance with an exemplary embodiment.

FIG. 13 is an exploded cross-sectional perspective view of a portion of a backlight assembly in accordance with an exemplary embodiment. FIG. 14 is a cross-sectional view of a portion of the backlight assembly in accordance with the exemplary embodiment of the FIG. 13.

Referring to FIGS. 13 and 14, the backlight assembly includes a receiving frame 700.

The receiving frame 700 includes a recess 780 into which a reflection sheet 600 is inserted, and a sheet fixing member 790 for fixing the reflection sheet 600 inserted into the recess 780. The recess 780 includes a sheet receiving space. A portion of a fixing portion 630 of the reflection sheet 600 is inserted into the sheet receiving space of the recess 780. At least a portion of the sheet fixing member 790 fixes the reflection sheet 600 inserted into the sheet receiving space of the recess 780. A width of an opening of the sheet receiving space in the recess 780 may be greater than the thickness of the reflection sheet 600 so that the reflection sheet 600 can be easily inserted into the sheet receiving space of the recess 780. In this embodiment, as illustrated in FIG. 14, the sheet fixing member 790 is inserted into the sheet receiving space of the recess 780. The sheet fixing member 790 is wedged into the sheet receiving space to press the reflection sheet 600, thereby inhibiting movement of the reflection sheet 600. After insertion of the reflection sheet 600, the sheet fixing member 790 is inserted at the open area of the sheet receiving space of the recess 780. Thus, a minimum width of a cross section of the sheet fixing member 790 may be less than a width of the opening of the sheet receiving space in the recess 780. Also, the minimum width of the cross section of the sheet fixing member 790 may be less than the width of the opening in the recess 780 after the insertion of the reflection sheet 600. As illustrated in FIG. 14, the cross section of the sheet fixing member 790 is shaped such that its one end is sharp, having a width that gradually increases to a predetermined value from the one end toward the other end, and then its width is constantly maintained at the predetermined value. The sheet fixing member 790 depicted in FIGS. 13 and 14 is formed to have a cross section with a pentagon shape. However, the shape of the cross section of the sheet fixing member 790 is not limited to a pentagon shape, and may be extended to a polygon shape, a half circular shape or the like.

When the sheet fixing member 790 is inserted into the sheet receiving space of the recess 780, it presses a portion of the reflection sheet 600. Accordingly, the sheet fixing member 790 may be formed of an elastic material so as to protect the reflection sheet 600. For example, rubbers, synthetic resins, or plastics can be used as the elastic material. As illustrated in FIG. 13, a single bar type sheet fixing member 790 may be inserted into the sheet receiving space of the recess 780. Alternatively, the sheet fixing member 790 may be formed of a plurality of separate pieces, and these pieces may be inserted into the sheet receiving space of the recess 780.

As described above, the reflection sheet can be stably fitted without using a separate adhesive by providing the receiving frame that has a recess receiving the reflection sheet.

By inserting the reflection sheet into the recess of the receiving frame during the assembling process of the backlight assembly, the reflection sheet can be prevented from being disengaged and unfastened without using an adhesive, and the number of assembling operations for the backlight assembly is reduced, which can simplify the assembling process of the backlight assembly.

In addition, the reflection sheet is inserted into the sheet receiving space of the recess, so that the sheet receiving space of the recess can provide sufficient space for extension and shrinkage of the reflection sheet due to varing environmental conditions.

Although the backlight assembly and the display device having the same have been described with reference to the specific embodiments, they are not limited thereto. Therefore, it will be readily understood by those skilled in the art that various modifications and changes can be made thereto without departing from the spirit and scope of the present invention defined by the appended claims.

What is claimed is:

1. A backlight assembly, comprising:
   a light source configured to generate light;
   a reflection sheet spaced apart from the light source to reflect the light from the light source; and
   a receiving frame having at least one wall and at least one recess portion recessed in a part of the wall, wherein the reflection sheet is inserted into the recess portion,
   wherein a supporting portion configured to support the reflection sheet is extended from the wall of the receiving frame adjacent the recess portion, the supporting portion comprising a protrusion section extending from the recess portion.

2. The backlight assembly of claim 1, wherein the recess portion includes a sheet receiving space configured to receive a portion of the reflection sheet and an opening to the sheet receiving space is provided in the wall of the receiving frame.

3. The backlight assembly of claim 2, wherein the receiving frame includes a plurality of recess portions, and the reflection sheet comprises an uneven pattern including a plurality of protrusions, each protrusion being inserted into a corresponding one of the recess portions.

4. The backlight assembly of claim 2, wherein the supporting portion extends from the wall of the receiving frame adjacent the opening to the sheet receiving space,
   the protrusion section extends from the opening, and the supporting portion further comprises an inclined section extending from an end of the protrusion section.

5. The backlight assembly of claim 2, wherein the supporting portion extends from the wall of the receiving frame adjacent the opening to the sheet receiving space, and
   the protrusion section extends from the opening, and the supporting portion further comprises an inclined section extending from an end of the protrusion section,
   the backlight assembly further comprising an optical plate disposed above the protrusion section.

6. The backlight assembly of claim 2, wherein the supporting portion extends from the wall of the receiving frame adjacent the opening to the sheet receiving space,
   the supporting portion comprising at least one projection, and the reflection sheet comprising at least one hole corresponding to the projection.

7. The backlight assembly of claim 2, further comprising at least one sheet fixing member, the sheet fixing member being inserted into the sheet receiving space to contact the reflection sheet.

8. The backlight assembly of claim 2, wherein the recess portion comprises a fixing portion protruding from an inside surface of the sheet receiving space.

9. The backlight assembly of claim 2, wherein a cross section of the sheet receiving space has at least one of a straight shape, a curved shape, an oblique shape, and a combination thereof.

10. The backlight assembly of claim 2, wherein a width of the sheet receiving space decreases in a direction toward an inner portion of the sheet receiving space.

11. The backlight assembly of claim 1, wherein the recess portion includes a sheet receiving space having a plurality of openings and the reflection sheet comprises an uneven pattern configured to be inserted into the sheet receiving space through the openings.

12. The backlight assembly of claim 1, further comprising:
    a lamp fixing frame coupled to the receiving frame; and
    an optical film unit supported by the lamp fixing frame and the receiving frame.

13. The backlight assembly of claim 12, further comprising a bottom plate contacting bottom surfaces of the receiving frame and lamp fixing frame.

14. A liquid crystal display device, comprising:
    a backlight assembly comprising:
       a light source configured to generate light;
       a reflection sheet spaced apart from the light source to reflect the light from the light source; and
       a receiving frame having at least one wall and at least one recess portion recessed in a part of the wall; and
    a liquid crystal display panel, wherein the reflection sheet is inserted into the recess portion,
    wherein a supporting portion configured to support the reflection sheet is extended from the wall of the receiving frame adjacent the recess portion, the supporting portion comprising a protrusion section extending from the recess portion.

15. The liquid crystal display device of claim 14, wherein the recess portion includes a sheet receiving space configured to receive a portion of the reflection sheet and an opening to the sheet receiving space is provided in the wall of the receiving frame.

16. The liquid crystal display device of claim 15, wherein the receiving frame includes a plurality of recess portions, and
    the reflection sheet comprises a plurality of protrusions, each protrusion being inserted into a corresponding one of the recess portions.

17. The liquid crystal display device of claim 15, wherein the supporting portion extends from the wall of the receiving frame adjacent the opening to the sheet receiving space,
    the supporting portion comprising at least one projection, and the reflection sheet comprising at least one hole corresponding to the projection.

18. The liquid crystal display device of claim 15, further comprising at least one sheet fixing member, the sheet fixing member being inserted into the sheet receiving space to contact the reflection sheet.

19. The liquid crystal display device of claim 15, wherein a cross section of the sheet receiving space has at least one of a straight shape, a curved shape, an oblique shape, and a combination thereof.

20. The liquid crystal display device of claim 15, wherein a width of the sheet receiving space gradually decreases in a direction toward an inner portion of the sheet receiving space.

* * * * *